(12) United States Patent
Wang et al.

(10) Patent No.: US 12,111,987 B2
(45) Date of Patent: Oct. 8, 2024

(54) INPUT DEVICE AND ELECTRONIC DEVICE INPUT SYSTEM

(71) Applicant: VIVO MOBILE COMMUNICATION CO., LTD., Guangdong (CN)

(72) Inventors: Youfei Wang, Guangdong (CN); Lingfei Xie, Guangdong (CN); Weili An, Guangdong (CN); Wei Wang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 17/968,977

(22) Filed: Oct. 19, 2022

(65) Prior Publication Data

US 2023/0038885 A1 Feb. 9, 2023

Related U.S. Application Data

(63) Continuation of application No. PCT/CN2021/089355, filed on Apr. 23, 2021.

(30) Foreign Application Priority Data

Apr. 24, 2020 (CN) .......................... 202010336290.2

(51) Int. Cl.
*G06F 3/0354* (2013.01)
*G06F 3/038* (2013.01)

(52) U.S. Cl.
CPC ...... *G06F 3/03547* (2013.01); *G06F 3/03543* (2013.01); *G06F 3/038* (2013.01); *G06F 2203/0333* (2013.01)

(58) Field of Classification Search
CPC ............ G06F 3/03547; G06F 3/03543; G06F 2203/0333; G06F 3/038
See application file for complete search history.

(56) References Cited

U.S. PATENT DOCUMENTS

| | | | |
|---|---|---|---|
| 10,592,008 B1 | 3/2020 | Wang et al. | |
| 2011/0310016 A1* | 12/2011 | Zucker | G06F 3/03543 206/524.6 |

(Continued)

FOREIGN PATENT DOCUMENTS

| | | |
|---|---|---|
| CN | 102339144 A | 2/2012 |
| CN | 208477487 U | 2/2019 |

(Continued)

OTHER PUBLICATIONS

Machine translation of JP3143935U (Year: 2008).*

(Continued)

*Primary Examiner* — Patrick N Edouard
*Assistant Examiner* — Joseph P Fox
(74) *Attorney, Agent, or Firm* — Fredrikson & Byron, P.A.

(57) ABSTRACT

This application discloses an input device and an electronic device input system. The input device includes a device body, a touchpad (400), and a first key (300); the device body includes a handheld part, the first key (300) and the touchpad (400) are arranged on the device body and located on the same side of the device body, and in a case that the handheld part is in a first state, a curvature of the handheld part is a first curvature; and in a case that the handheld part is in a second state, the curvature of the handheld part is a second curvature, and the first curvature is greater than the second curvature.

12 Claims, 2 Drawing Sheets

(56) References Cited

U.S. PATENT DOCUMENTS

2019/0079584 A1     3/2019   Bonanno et al.
2019/0187819 A1*   6/2019   Ullrich .................. G06F 3/0354
2019/0272048 A1*   9/2019   Lin ..................... G06F 3/03543

FOREIGN PATENT DOCUMENTS

EP           2400376 A1 * 12/2011  ......... G06F 3/03543
JP           3143935 U  *  8/2008

OTHER PUBLICATIONS

International Patent Application No. PCT/CN2021/089355, International Search Report and Written Opinion with Partial English Machine Translation mailed Jul. 29, 2021, 9 pages.
European Patent Office, "Extended European Search Report" from Application No. 21792838.1, dated Aug. 8, 2023, pp. 1-4.

\* cited by examiner

INPUT DEVICE AND ELECTRONIC DEVICE INPUT SYSTEM

CROSS-REFERENCE TO RELATED APPLICATION

This application is a continuation of International Application No. PCT/CN2021/089355, filed on Apr. 23, 2021, which claims priority to Chinese Patent Application No. 202010336290.2, entitled "INPUT DEVICE AND ELECTRONIC DEVICE INPUT SYSTEM", filed in China on Apr. 24, 2020, which is incorporated herein by reference in its entirety.

TECHNICAL FIELD

This application relates to the field of input device technologies of electronic devices, and in particular, to an input device and an electronic device input system.

BACKGROUND

As the application of electronic devices is increasingly wide, functions of the electronic devices are more and more. The electronic devices can satisfy the needs of a user, such as audio-visual entertainment. In order to make the operation of the electronic devices more convenient in office or games, the electronic devices are usually equipped with peripheral input devices, and commonly used peripheral input devices include an operating handle and a mouse. The user can use different types of input devices in different scenarios. For example, the operating handle is mostly manually held and is freely used in a space, while the mouse needs desktop support when used, so that the user needs to be equipped with two types of input devices: the mouse and the operating handle. A switching operation between the operating handle and the mouse is complex, resulting in relatively poor compatibility between the input devices and relatively poor user experience.

SUMMARY

According to a first aspect of this application, an input device is provided, which includes a device body, a touchpad, and a first key, where
the device body includes a handheld part, the first key and the touchpad are arranged on the device body and located on the same side of the device body, and in a case that the handheld part is in a first state, a curvature of the handheld part is a first curvature; and in a case that the handheld part is in a second state, the curvature of the handheld part is a second curvature, and the first curvature is greater than the second curvature.

According to a second aspect of this application, an electronic device input system is provided, which includes the foregoing input device.

BRIEF DESCRIPTION OF THE DRAWINGS

To describe the technical solutions in embodiments of this application or the related art more clearly, the following briefly describes the accompanying drawings required for describing the embodiments or the related art. Apparently, a person of ordinary skill in the art may still derive other accompanying drawings from the accompanying drawings without creative efforts.

REFERENCE NUMERALS

100—Device housing, 110—First sensing support surface, 120—Second sensing support surface,
210—First non-slip pad, 220—Second non-slip pad,
300—First key, 310—First sub-key, 320—Second sub-key, 330—Scroll wheel,
400—Touchpad, and
500—Second key.

DETAILED DESCRIPTION

In order to make the objectives, technical solutions and advantages of this application clearer, the technical solutions of this application will be described clearly in combination with specific embodiments of this application and corresponding accompanying drawings. Obviously, the described embodiments are only part of the embodiments of this application and not the whole embodiments. All other embodiments obtained by a person of ordinary skill in the art based on the embodiments of this application without creative efforts shall fall within the protection scope of this application.

The terms "first", "second", and the like in the specification and claims of the application are intended to distinguish similar objects, but not intended to describe a specific order or sequence. It should be understood that the data used in this way can be interchanged in appropriate cases, so that the embodiments of this application can be implemented in an order other than those illustrated or described herein. In addition, in the specification and claims, "and/or" refers to at least one of connected objects, and the character "l" generally indicates that the front and rear associated objects are in an "or" relationship.

The technical solutions disclosed in the embodiments of this application are described in detail below with reference to the accompanying drawings.

Figure 1:
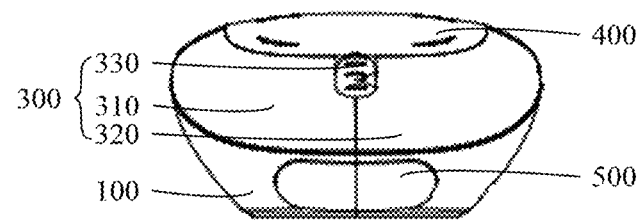
FIG. 1 is a front view of an input device disclosed in an embodiment of this application.
Figure 2:
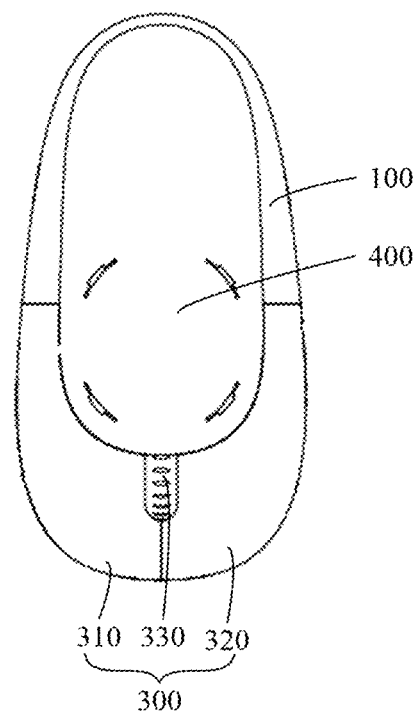
FIG. 2 is a top view of an input device disclosed in an embodiment of this application.
Figure 3:
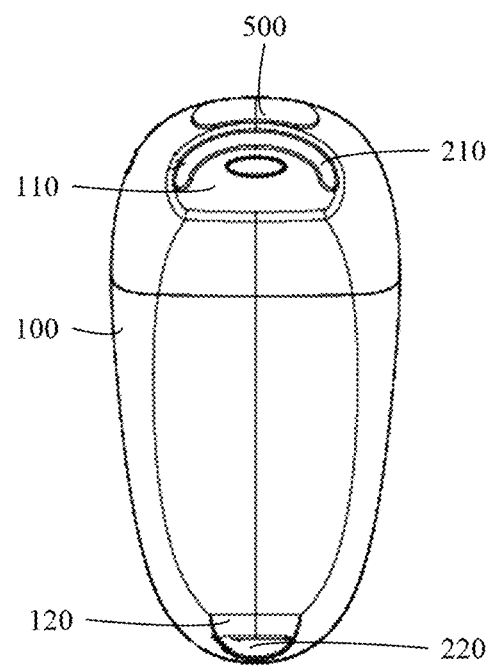
FIG. 3 is a bottom view of an input device disclosed in an embodiment of this application.
Figure 4:
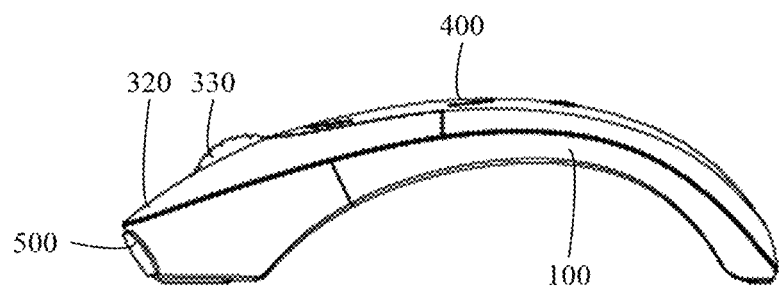
FIG. 4 is a schematic diagram of an input device in a first state disclosed in an embodiment of this application.
Figure 5:
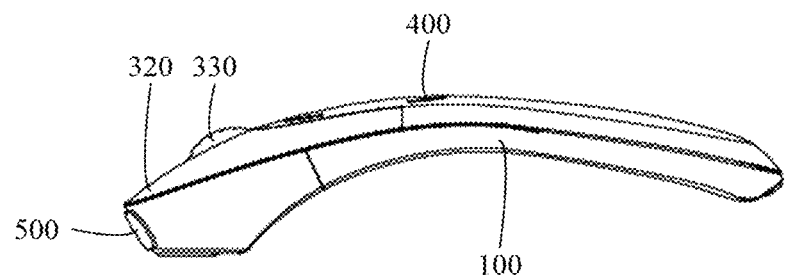
FIG. 5 is a schematic diagram of an input device in a second state disclosed in an embodiment of this application.

As shown in FIG. 1 to FIG. 5, embodiments of this application disclose an input device, and the input device is configured to operate an electronic device. The input device can include a device body, a touchpad 400, and a first key 300.

The device body is a main part of the input device, and the device body includes main functional devices, such as a handheld part, a circuit board, and a chip. The handheld part is a part held by a user, and the handheld part can be deformed. The handheld part has a first state and a second state, and the handheld part can switch between the first state and the second state through deformation. In a case that the handheld part is in the first state, a curvature of the handheld part is a first curvature. In a case that the handheld part is in the second state, the curvature of the handheld part is a second curvature; and the first curvature is greater than the second curvature. That is to say, the handheld part in the first state is more curved than the handheld part in the second state, and a height of the input device is larger. Optionally, the handheld part can be made of a deformable material or the handheld part has a deformable structure.

In an embodiment of this application, by changing a curvature of the handheld part in different use environments, the fit between an input device and a palm of a user is better, so that the user has a relatively comfortable sense of grip in different use environments. By adjusting the curvature of the handheld part, the user can make the input device switch freely in different environments, so that the input device has better compatibility, thereby further improving the user experience.

For example, in a case that the handheld part is in the first state, the curvature of the handheld part is relatively large, and the handheld part is more curved, so that the height of the input device is increased and the position on the input device supporting the center of the palm of the user is fuller and more rounded. In this case, the input device can be used in a desktop environment, and the input device can better support the center of the palm of the user. In a case that the handheld part is in the second state, the curvature of the handheld part is relatively small, and the height of the input device is relatively small. This case is more suitable for the user to hold the input device around with one hand or hold the input device with both hands, and the palm of the user can be closer to the surface of the handheld part, so that the user has a better sense of grip.

Optionally, the input device disclosed in the embodiments of this application can further include a data connection line, and data transmission of the input device and the electronic device can be carried out through the data connection line. Alternatively, a first wireless data transmission module can be arranged in the input device, the electronic device is equipped with a second wireless data transmission module, and the input device and the electronic device can carry out the data transmission through the first wireless data transmission module and the second wireless data transmission module. In an optional embodiment, in a case that the handheld part is in the first state, the first key 300 can be in an active state; and in a case that the handheld part is in the second state, the touchpad 400 can be in the active state. In a case that the first key 300 and the touchpad 400 are in the active state, the first key 300 and the touchpad 400 can respond to an input state of the user. In a case that the handheld part is in the first state, the user can operate the electronic device through the first key 300; and in a case that the handheld part is in the second state, the user can operate the electronic device through the touchpad 400. In this solution, the handheld part has corresponding operation control keys in different states, thereby meeting operation requirements of the input devices in the different states.

In the foregoing embodiment, in a case that the handheld part is in the first state, when the touchpad 400 is in the active state, the user is easy to touch the touchpad 400 when using the input device, and then easy to cause a misoperation of the input device. In a case that the handheld part is in the second state, it is also easy to cause the above problem when the first key 300 is in the active state. In an optional embodiment, in a case that the handheld part is in the first state, the touchpad 400 can be in an inactive state; and in a case that the handheld part is in the second state, the first key 300 can be in the inactive state. In a case that the handheld part is in the first state, the touchpad 400 cannot respond to the input state of the user. That is to say, in this case, the touchpad 400 cannot operate the electronic device, so to avoid the misoperation of the user. Certainly, in a case that the handheld part is in the second state, the first key 300 cannot respond to the input state of the user. That is to say, in this case, the first key 300 cannot operate the electronic device.

For ease of the operation of the input device, in an optional embodiment, the input device disclosed in the embodiments of this application can further include a second key 500, and the second key 500 is arranged on the device body. The second key 500 can be used in conjunction with the touchpad 400, thereby improving the operational performance of the input device. For example, the touchpad 400 can be a direction control key, and the second key 500 can be a determining control key.

Optionally, in a case that the handheld part is in the first state, the second key 500 is in an inactive state; and in a case that the handheld part is in the second state, the second key 500 is in the active state. In this case, the handheld part is in the second state, and the second key 500 can operate the electronic device. In a case that the handheld part is in the first state, the second key 500 cannot operate the electronic device, thereby avoiding the misoperation of the input device.

In an optional embodiment, the second key 500 and the touchpad 400 can be located on the same side of the device body. In this solution, when the user holds the input device with both hands, the thumb of one hand of the user can operate the touchpad 400, and the thumb of the other hand can operate the second key 500, thereby making the operation of the input device convenient.

In the foregoing embodiment, when the user holds the input device with one hand, the thumb of the user needs to operate both the touchpad 400 and the second key 500, making the operation inconvenient. Therefore, in another optional embodiment, the second key 500 and the touchpad 400 can be located on adjacent two sides of the device body. In this case, the thumb of the user is close to a top part of the input device, so that the touchpad 400 can be operated; and the index finger of the user is close to a side part of the input device, so that the second key 500 can be operated, making the operation of the input device more convenient when the input device is held with one hand.

In an optional embodiment, in a case that the handheld part is in the first state, the input device can be a mouse, and in a case that the handheld part is in the second state, the input device can be an operating handle. In this solution, the input device can realize the operation functions of such two devices as the mouse and the operating handle, which makes it more convenient for the user to use and carry the input device. In this case, the input device can take both office and game functions into account, which can improve the compatibility of the input device.

The input device 100 disclosed in the embodiments of this application can include a device housing 100, the device housing 100 provides an installation foundation for some functional devices of the input device, and the handheld part and the device housing can be two independent parts, but this method makes the volume of the input device relatively large. In another optional embodiment, the handheld part can include at least one part of the device housing 100, and the at least one part of the device housing can be made of a deformable material. In this solution, the device housing 100 can be configured to provide the installation foundation for the some functional devices of the input device, and can be further configured for the user to hold, so as to make the volume of the input device relatively small and make it convenient to carry the input device.

Optionally, a corresponding structure inside a part of the device housing 100 for holding, for example, a circuit board in the device housing 100 can be deformed with the deformation of the device housing 100. The circuit board can be a flexible circuit board, and therefore can be deformed with the device housing 100.

In another optional embodiment, a bottom surface of the device housing 100 may include a first sensing support surface 110 and a second sensing support surface 120, the first sensing support surface 110 and the second sensing support surface 120 may be both planar, the first sensing support surface 110 and the second sensing support surface 120 may be located at two ends of the device housing 100 respectively, and in a case that the handheld part is in the first state, the first sensing support surface 110 and the second sensing support surface 120 are coplanar. In this solution, in a case that the handheld part is in the first state, the input device can be applied to the desktop environment, and the first sensing support surface 110 and the second sensing support surface 120 are in contact with a desktop, and therefore can be used for supporting the input device, thereby enabling the input device to move stably on the desktop. In addition, the first sensing support surface 110 and the second sensing support surface 120 control a movement of a cursor of the electronic device by sensing a movement of the input device (similar to controlling the movement of the cursor when the mouse moves).

Optionally, the first sensing support surface 110 and the second sensing support surface 120 can adopt a method of photoelectric sensing, and can also adopt a method of capacitive sensing. This is not limited herein.

In an optional embodiment, the input device disclosed in the embodiments of this application can further include a first non-slip pad 210, and the first non-slip pad 210 covers at least one part of the first sensing support surface 110. This solution can prevent the first sensing support surface 110 from slipping on the desktop.

Further, the input device can further include a second non-slip pad 220, and the second non-slip pad 220 covers at least one part of the second sensing support surface 120. This solution can prevent the second sensing support surface 120 from slipping on the desktop.

Optionally, the first non-slip pad 210 and the second non-slip pad 220 can be made of a material such as silicone or rubber, and certainly can also be made of another material. This is not limited herein.

This application discloses a type of switching structure of the handheld part. Certainly, the handheld part can also adopt other switching structures. This is not limited herein. Alternatively, the handheld part can further include an inner deformation positioning member arranged in the device housing 100, the inner deformation positioning member is configured to keep the device housing 100 in the first state, and the inner deformation positioning member is not deformed with the housing. One of the device housing 100 and the inner deformation positioning member is provided with a first clamping part, the other one thereof is provided with a second clamping part, and in a case that the handheld part is in the first state, the first clamping part is engaged with the second clamping part; and in a case that the handheld part is in the second state, the first clamping part is separated from the second clamping part. In a specific operation process, when the handheld part is switched from the second state to the first state, the user can exert a force on the device housing 100, so as to bend the device housing 100 and cause the first clamping part to be engaged with the second clamping part; when the handheld part is switched from the first state to the second state, the user can exert a reverse force on the device housing 100, so as to cause the first clamping part to be separated from the second clamping part. In this solution, after the first clamping part is engaged with the second clamping part, the deformation of the device housing 100 can be avoided, so as to keep the device housing 100 in the first state stably.

This application further discloses a second type of switching structure of the handheld part. Alternatively, the handheld part further includes an inner deformation positioning member arranged in the device housing 100, the inner deformation positioning member is configured to keep the device housing 100 in the first state, and the inner deformation positioning member is not deformed with the housing. One of the device housing 100 and the inner deformation positioning member is provided with a magnetic member, the other one thereof is provided with a magnetic attraction member, and in a case that the handheld part is in the first state, the magnetic member is separated from the magnetic attraction member; and in a case that the handheld part is in the second state, the magnetic member is in magnetic attraction fit with the magnetic attraction member. In a specific operation process, when the handheld part is switched from the second state to the first state, the user can cause the magnetic member to be magnetically opposite to the magnetic attraction member, and the magnetic member is in magnetic attraction fit with the magnetic attraction member, so as to bend the device housing 100; when the handheld part is switched from the first state to the second state, the user can cause the magnetic member to be magnetically the same as the magnetic attraction member or to be non-magnetic, to separate the magnetic member from the magnetic attraction member, thereby restoring the device housing 100 to the second state. In this solution, the switching between the first state and the second state of the handheld part can be carried out through the fit between the magnetic member and the magnetic attraction member, so as to make the switching method of the input device simple and convenient.

Optionally, each of the magnetic member and the magnetic attraction member can be an electromagnetic coil; or the magnetic member is an electromagnetic coil and the magnetic attraction member is a permanent magnet. The magnetic member can be a permanent magnet, the magnetic attraction member can be a metal part, and the user exert an external force on the device housing 100, so that the switching between the first state and the second state of the handheld part is carried out.

In an optional embodiment, the handheld part can be a memory alloy member. In this solution, the memory alloy member can be kept in a certain state in which the memory alloy member is deformed, so that there is no need to set other deformation positioning members in the device housing 100 to maintain the deformation state of the handheld part, thereby making the structure of the handheld part simple. Optionally, the switching between the first state and the second state of the memory alloy member can be controlled by changing a temperature of the memory alloy member.

In an optional embodiment, the first key 300 can include a first sub-key 310, a second sub-key 320, and a scroll wheel 330, a part of the scroll wheel 330 is arranged in an assembly gap between the first sub-key 310 and the second sub-key 320, the scroll wheel 330 protrudes from an outer surface of the device body, and a protruding part of the scroll wheel 330 makes it convenient for the user to operate. In this solution, the first key 300 can include a plurality of sub-keys, so that the first key 300 can carry out more operation functions. In addition, a setting method of the first key 300 also meets the key layout method of the mouse, so that the input device can also be used as the mouse, thereby improving the compatibility of the input device.

The embodiments of this application further disclose an electronic device input system, and the disclosed electronic device input system includes an electronic device and the input device in any one of the foregoing embodiments.

The electronic device disclosed in the embodiments of this application can be a smartphone, a tablet computer, an e-book reader, a wearable device (such as a smart watch), a video game console, and other devices, and the embodiments of this application do not limit specific types of the electronic device.

In the above embodiments of the application, the differences between embodiments are mainly described. As long as the different optimization features between embodiments are not contradictory, they can be combined to form better embodiments. Considering the conciseness of the writing, no repeated description is provided.

The above are only embodiments of this application and are not intended to limit this application. For a person skilled in the art, various modifications and changes can be made to this application. Any modification, equivalent replacement, or improvement made application spirit and principle of this application shall fall within the scope of the claims of this application.

What is claimed is:

1. An input device, comprising:
a device body,
a touchpad (400),
a first key (300), and
a second key (500);
wherein the device body comprises a handheld part, the first key (300) and the touchpad (400) are arranged on the device body and located on the same side of the device body, and in a case that the handheld part is in a first state, a curvature of the handheld part is a first curvature; and in a case that the handheld part is in a second state, the curvature of the handheld part is a second curvature, and the first curvature is greater than the second curvature;
the second key (500) is arranged on the device body;
the second key (500) and the touchpad (400) are located on the same side of the device body or the second key (500) and the touchpad (400) are located on adjacent two sides of the device body;
wherein
in a case that the handheld part is in the first state, the first key (300) is in an active state and the second key (500) is in an inactive state; and in a case that the handheld part is in the second state, the second key (500) is in the active state and the touchpad (400) is in the active state.

2. The input device according to claim 1, wherein in a case that the handheld part is in the first state, the touchpad (400) is in an inactive state; and in a case that the handheld part is in the second state, the first key (300) is in the inactive state.

3. An electronic device input system, comprising an electronic device and the input device according to claim 2.

4. The input device according to claim 1, wherein in a case that the handheld part is in the first state, the input device is a mouse, and in a case that the handheld part is in the second state, the input device is an operating handle.

5. An electronic device input system, comprising an electronic device and the input device according to claim 4.

6. The input device according to claim 1, wherein the device body comprises a device housing (100), the handheld part comprises at least one part of the device housing (100), a bottom surface of the device housing (100) comprises a first sensing support surface (110) and a second sensing support surface (120), the first sensing support surface (110) and the second sensing support surface (120) are both planar, the first sensing support surface (110) and the second sensing support surface (120) are located at two ends of the device housing respectively, and in a case that the handheld part is in the first state, the first sensing support surface (110) and the second sensing support surface (120) are coplanar.

7. The input device according to claim 6, wherein the input device further comprises a first non-slip pad (210), and the first non-slip pad (210) covers at least one part of the first sensing support surface (110); and/or
the input device further comprises a second non-slip pad (220), and the second non-slip pad (220) covers at least one part of the second sensing support surface (120).

8. An electronic device input system, comprising an electronic device and the input device according to claim 7.

9. An electronic device input system, comprising an electronic device and the input device according to claim 6.

10. The input device according to claim 1, wherein the handheld part is a memory alloy member.

11. The input device according to claim 1, wherein the first key (300) comprises a first sub-key (310), a second sub-key (320), and a scroll wheel (330), a part of the scroll wheel (330) is arranged in an assembly gap between the first sub-key (310) and the second sub-key (320), and the scroll wheel (330) protrudes from an outer surface of the device body.

12. An electronic device input system, comprising an electronic device and the input device according to claim 1.

* * * * *